United States Patent [19]
Farrell et al.

[11] 3,738,158
[45] June 12, 1973

[54] GROSS LEAK VACUUM AND PRESSURE CHAMBER ASSEMBLY

[75] Inventors: John P. Farrell, Utica; Edward P. O'Connell, Rome, both of N.Y.

[73] Assignee: The United States of America as represented by the Secretary of the Air Force, Washington, D.C.

[22] Filed: Apr. 6, 1972

[21] Appl. No.: 241,549

[52] U.S. Cl. .......................... 73/40.7, 73/49.3, 73/52
[51] Int. Cl. ............................................. G01m 3/20
[58] Field of Search .................... 73/52, 49.3, 40.7, 73/49.2

[56] References Cited
UNITED STATES PATENTS

| | | | |
|---|---|---|---|
| 3,504,528 | 4/1970 | Weinberg et al. ................... | 73/49.3 |
| 3,672,207 | 6/1972 | Cramp et al. ......................... | 73/40.7 |
| 3,675,468 | 7/1972 | Caccamesi et al. .................. | 73/40.7 |

*Primary Examiner*—Louis R. Prince
*Assistant Examiner*—Joseph W. Roskos
*Attorney*—Harry A. Herbert, Jr. and Arsen Tashjian et al.

[57] ABSTRACT

A chamber assembly for subjecting a hermetically sealed package to a vacuum, to changes in pressure and to other procedures to precondition the package prior to testing it to determine its degree of hermeticity. The assembly includes a test chamber, a receptacle which fits into the test chamber and houses the hermetically sealed package which is to be preconditioned, a source of gas under high pressure connected to the test chamber, a source of fluorocarbon liquid also connected to the test chamber, a vacuum pump likewise connected to the test chamber, and cooperative interconnected components, such as a pressure regulator, a vacuum gauge, a safety valve, and a plurality of pressure shutoff valves and of vacuum shutoff valves. The hermetically sealed package is placed within the receptacle which, in turn, is placed within the test chamber. The hermetically sealed package is then subjected to art-accepted preconditioning procedures, including exposure to a vacuum, changes in pressure, and soaking in fluorocarbon liquid, without being exposed to ambient during the performance of the procedures.

5 Claims, 1 Drawing Figure

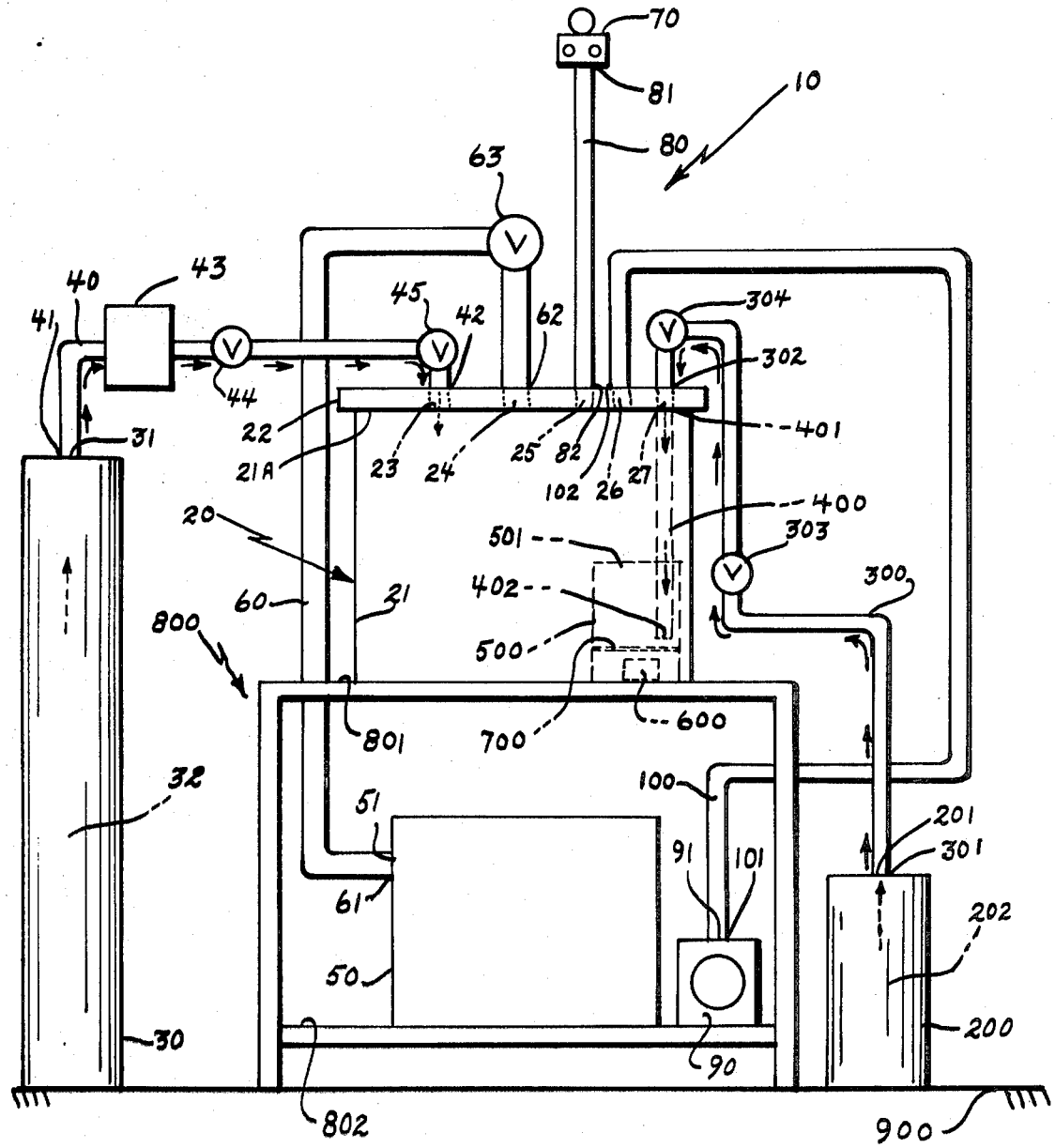

form, of a preferred embodiment of our invention.

GROSS LEAK VACUUM AND PRESSURE CHAMBER ASSEMBLY

BACKGROUND OF THE INVENTION

This invention relates to the hermeticity testing art and, more particularly, to apparatus for preconditioning hermetically sealed packages for subsequent testing to determine degree of hermeticity.

There is a continuing need for simple, inexpensive, and reliable apparatus for preconditioning hermetically sealed packages for subsequent testing as to their degree of hermeticity. As a related matter, since the advent of the hermetically sealed package, many tests have been devised and used to determine the degree of hermeticity of the package as a result of, and after, sealing. In particular, and with regard to, the expanding microcircuit technology field, hermetically sealed packages of microelectronic devices have increased in size and complexity and, consequently, have compounded both the testing of these packages and the preconditioning of these packages for subsequent testing as to hermeticity. It is here to be noted that the phrase "microelectronic device," or the like, is intended to include monolithic, multichip, film, and hybrid microcircuits, microcircuit arrays, and the elements from which the circuits and arrays are formed.

Hermeticity testing, as it is applied to hermetically sealed packages of microelectronic devices, and as it is presently known in the art, is divided into two ranges: (a) "gross leak" — atmosphere to $5 \times 10^{-5}$ atm cc/sec; and (b) "fine leak" — $5 \times 10^{-5}$ atm cc/sec to $1 \times 10^{-8}$ atm cc/sec.

For illustrative purposes, and as a matter of preference and not of limitation, our inventive apparatus will be shown and described herein as it applies to a preferred embodiment for performing preconditioning procedures on a hermetically sealed package of a microelectronic device, which preconditioning is considered necessary in the art prior to the testing of the package to determine the degree of its hermeticity. Further, our preferred embodiment is an adaptation of our inventive apparatus for use in performing preconditioning procedures as set forth in the "gross leak" portion of an art-accepted preconditioning method used by the U.S. Government and commonly referred to in the art as "Test Condition C, Method 1014, MIL-STD-883, Test Methods and Procedures for Microcircuits," which will be further discussed herein.

To the best of our knowledge, our inventive apparatus is unknown in the prior art and represents a significant advance.

SUMMARY OF THE INVENTION

This invention pertains to an apparatus for preconditioning a hermetically sealed package prior to testing it to determine its degree of hermeticity, without exposing the package to room ambient during the preconditioning.

Therefore, the principal object of this invention is to provide novel, but simple, inexpensive, and reliable, apparatus to permit said preconditioning of a hermetically sealed package.

Another object of this invention is to provide an adaptation of the above-described inventive apparatus to allow the performance of art-accepted preconditioning procedures on and to a hermetically sealed package of a microelectronic device.

Still another object of this invention is to provide aforesaid apparatus for subjecting a hermetically sealed package of a microelectronic device to the preconditioning procedures prescribed in, and referred to, as "Test Condition C, Method 1014, MIL-STD-883, Test Methods and Procedures for Microcircuits," for subsequent testing in the "gross leak" range.

These objects, and other equally important and related objects, of this invention will become readily apparent after a consideration of the description of our invention and reference to the drawing.

DESCRIPTION OF THE DRAWING

The drawing is a front elevation view, in simplified schematic form, of a preferred embodiment of our invention.

DESCRIPTION OF THE PREFERRED EMBODIMENT

With reference to the drawing, therein is shown, in simplified schematic form, a preferred embodiment 10 of our inventive apparatus.

Preferred embodiment 10 includes: vacuum/pressure chamber or tank 20 (hereinafter referred to as "test chamber") which is made of fluid-impervious material and comprises a container 21 open at the top 21A, and a removable lid or cover 22 for covering and uncovering (i.e., opening and closing) open top 21A of container 21, with said lid 22 having a first 23, a second 24, a third 25, a fourth 26, and a fifth 27 suitably positioned opening; a source 30 of gas 32, preferably nitrogen, under high pressure, with said gas source 30 having an outlet 31; a first hollow conduit 40 having two open ends 41 and 42, with one end 41 removably connected to gas source outlet 31 and with the other end 42 removably connected to first opening 23 of lid 22 of test chamber 20, to permit the flow therein of the gas 32 from gas source 30 into test chamber 20; a pressure regulator 43, disposed between gas source outlet 31 and first opening 23 of lid 22 of test chamber 20, and connected to first hollow conduit 40, to regulate the pressure of the gas 32 from source 30 to test chamber 20; a first pressure shutoff valve 44, disposed between pressure regulator 40 and first opening 23 of lid 22 of test chamber 20, and connected to first hollow conduit 40 to control the flow of the gas 32 from source 30 to test chamber 20; and, first vacuum shutoff valve 45, disposed between first pressure shutoff valve 44 and first opening 23 of lid 22 of test chamber 20, and connected to first hollow conduit 40.

The preferred embodiment 10 also includes: conventional vacuum pump 50 with opening 51; a second hollow conduit 60 having two ends 61 and 62, with one end 61 removably connected to vacuum pump opening 51 and with the other end 62 removably connected to second opening 24 of lid 22 of test chamber 20; a second vacuum shutoff valve 63, disposed between vacuum pump opening 51 and second opening 24 of lid 22 of test chamber 20, and connected to second hollow conduit 60; a safety valve 70; a third hollow conduit 80 having two ends 81 and 82, with one end 81 removably connected to safety valve 70 and with the other end 82 removably connected to third opening 25 of lid 22 of test chamber 20; a conventional vacuum gauge 90 with opening 91; and a fourth hollow conduit 100 having two ends 101 and 102, with one end 101 removably connected to vacuum gauge opening 91 and with the other end 102 removably connected to fourth opening 26 of lid 22 of test chamber 20.

Preferred embodiment 10 further includes: a source 200 of fluorocarbon liquid 202, preferably a fluorocarbon liquid 202 of the completely fluorinated type such as is known in the art as "FC-78," with said fluorocarbon liquid source 200 having an outlet 201; a fifth hollow conduit 300 having two ends 301 and 302, with one end 301 removably connected to fluorocarbon liquid source outlet 201 and with the other end 302 removably connected to fifth opening 27 of lid 22 of test chamber 20, to permit the flow therein of the fluorocarbon liquid 202 from fluorocarbon liquid source 200 into test chamber 20; a second pressure shutoff valve 303, disposed between fluorocarbon liquid outlet 201 and fifth opening 27 of lid 22 of test chamber 20, and connected to fifth hollow conduit 300 to control the flow of the fluorocarbon liquid 202 from fluorocarbon liquid source 200 to test chamber 20; a third vacuum shutoff valve 304, disposed between second pressure shutoff valve 303 and the fifth opening 27 of lid 22 of test chamber 20, and connected to fifth hollow conduit 300; and a sixth hollow conduit 400 disposed within test chamber 20 and having two ends 401 and 402, with one end 401 removably connected to both the fifth opening 27 of lid 22 of test chamber 20 and to that end 302 of the fifth hollow conduit 300 which is connected to fifth opening 27 of lid 22 of test chamber 20.

The preferred embodiment 10 additionally includes: a receptacle 500 open at the top 501, made of transparent material, such as "Pyrex" glass, which is impervious to the fluorocarbon liquid 202 from the fluorocarbon liquid source 200, with said receptacle 500 having such dimensions and being of such configuration as to house the hermetically sealed package, such as 600, which is to be preconditioned, as to fit into test chamber 20, and as to fit under the other end 402 of sixth hollow conduit 300; and a mesh or screen 700, preferably of stainless steel, which can be positioned within receptacle 500 and which can be disposed above the hermetically sealed package, such as 600, which is to be preconditioned, when the hermetically sealed package is within receptacle 500.

The flow of gas 32 from source 30, through first hollow conduit 40, and into test chamber 20 is as shown by the arrows in the drawing.

The flow of fluorocarbon liquid 202 from source 200, through fifth hollow conduit 300, into test chamber 20, through sixth hollow conduit 400, through screen 700, and into receptacle 500 and onto hermetically sealed package 600 is also designated by arrows in the drawing.

Although table or support stand 800, with top 801 and shelf 802, is shown in the drawing, the table 800 is not part of our inventive apparatus. However, it may be used advantageously, as shown in the drawing, to support test chamber 20 on the top 801 and vacuum pump 50 and vacuum gauge 90 on the shelf 802. The ground or floor plane is designated by reference numeral 900.

It is to be noted that when removable lid 22 is positioned to cover and close open top 21A of container 21, and when hollow conduits 40, 60, 80, 100 and 300 are also removably connected concurrently as herein stated (including removable connection respectively to openings 23, 24, 25, 26 and 27 in lid 22), the test chamber 20 (and the inventive apparatus 10 as a whole) is sealed against room ambient, i.e., is ambient-impervious.

MODE OF OPERATION OF THE PREFERRED EMBODIMENT

Our inventive apparatus 10 can be more easily understood and can be better appreciated if, as a preliminary matter, the preconditioning procedures required by the aforesaid "Test Condition C, Method 1014, MIL-STD-883, Test Methods and Procedures for Microcircuits," for the subsequent testing of a hermetically sealed package of a microelectronic device in the "gross leak" range are explained for those not in the art.

In essence, the preconditioning procedures or steps prescribed by the above-mentioned "Test Condition C" with regard to "gross leak" are: firstly, placing the hermetically sealed package of a microelectric device within a suitable vacuum and pressure chamber, and evacuating the chamber to a pressure of 1 torr or less, for a minimum of one hour; secondly, submerging the device, still under reduced pressure and still in the chamber, into a low boiling point (and completely fluorinated type) of fluorocarbon liquid, such as is known in the art as "FC-78;" and, thirdly, subjecting the device, while still in the chamber and while still immersed in the fluorocarbon liquid to a pressure of 90 psig for a minimum of three hours. It is reiterated and emphasized that these preconditioning procedures or steps are performed on and to the package without exposing the package to room ambient. Of course, after the performance of these preconditioning procedures, the chamber is permitted to reach atmospheric pressure; and, the device is thereafter removed from the chamber.

More specifically, and with reference to our preferred embodiment 10 and the drawing thereof, the preconditioning procedures and steps required by the aforesaid art-accepted Governmental "Test Condition C" with regard to "gross leak" of a hermetically sealed package of a microelectronic device are as follows:

First, the hermetically sealed package of the microelectronic device 600 to be preconditioned is placed into receptacle 500 through open top thereof 501 and screen 700 is positioned within receptacle 500 and is disposed above package 600. In turn, the receptacle 500 with package 600 and screen 700 therein is placed into container 21 of test chamber 20 through the open top 21A of the container 21, with open top 501 of receptacle 500 disposed under open end 402 of sixth hollow conduit 400, and the lid 22 is positioned to cover and to close the open top 21A, thereby making test chamber 20 (and the preferred embodiment 10 as a whole) ambient-impervious.

Then, the first pressure shutoff valve 44, the second pressure shutoff valve 303, first vacuum shutoff valve 45, and the third vacuum shutoff valve 304 are closed, and the second vacuum shutoff valve 63 is opened.

Next, vacuum pump 50 is operated until vacuum gauge 90 reads 1 torr or less. This pressure is maintained for a minimum of 1 hour.

Then, the second vacuum shutoff valve 63 is closed, and second pressure shutoff valve 303 and third vacuum shutoff valve 304 are opened. Thereby, fluorocarbon liquid 202 is drawn from source 200 into test chamber 20 and into receptacle 500, through source outlet 201, through fifth hollow conduit 300 (through open ends 301 and 302 thereof), through fifth opening 27 in lid 22, and through sixth hollow conduit 400 (through open ends 401 and 402). The fluorocarbon liquid 202 flowing into receptacle 500 through open top 501 strikes the screen 700 which reduces the impinging force of the flow of fluorocarbon liquid 202, thereby preventing, however unlikely, the wash out of package 600 from receptacle 500. Fluorocarbon liquid 202 then flows through screen 700 and submerges package 600. It is to be noted that fluorocarbon liquid 202 is drawn into test chamber 20 without breaking the vacuum (i.e., pressure of 1 torr or less) existing in test chamber 20.

When, in fact, package 600 is submerged in fluorocarbon liquid 202, second pressure shutoff valve 303 and third vacuum shutoff valve 304 are closed.

Then, first pressure shutoff valve 44 and first vacuum shutoff valve 45 are opened. Thereby, gas 32 under pressure from and in source 30 flows into test chamber 20, through source outlet 31, through first hollow conduit 40 (through open ends 41 and 42) and through pressure regulator 43, and through first opening 23 in lid 22. A pressure of 90 psig is permitted to be exerted by the use of gas 32 in test chamber 20 for a minimum of 3 hours. This completes the preconditioning procedures.

As can be seen, at no time during the performance of the preconditioning procedures is the package, such as 600, exposed to room ambient.

Thereafter, first pressure shutoff valve 44 and first vacuum shutoff valve 45 are closed, and safety valve 70 is opened to allow test chamber 20 (and the contents therein, including package 600) to reach atmospheric pressure.

Next, test chamber 20 is opened by lifting lid 22, and receptacle 500, with package 600, fluorocarbon liquid 202, and screen 700 therein, is removed from container 21 of test chamber 20 through open top 21A.

As a result, hermetically sealed package of the microelectronic device 600 is now ready for testing as to its degree of hermeticity (or, as may be applicable in a particular case, the package 600 is ready for other, and additional, preconditioning procedures not involving the use of test chamber 20 or of preferred embodiment 10).

While there have been shown and described the fundamental features of the invention, as applied to a preferred embodiment and as adapted for a particular use, it is to be understood that various substitutions and omissions may be made by those of ordinary skill in the art without departing from the spirit of the invention. For example, the openings 23, 24, 25, 26 and 27 may be suitably positioned in the test chamber 20, other than in the lid 22. Additionally, a plurality of packages, rather than a single package as illustrated in the preferred embodiment, may be simultaneously preconditioned. Further, our inventive apparatus may be used, or may be adapted to be used, to perform preconditioning procedures, other than those prescribed by the above-mentioned "Condition C," on and to hermetically sealed packages of microelectronic devices or to hermetically sealed packages of other devices, components, and the like.

What is claimed is:

1. A test chamber assembly for subjecting a hermetically sealed package to a vacuum, to changes in pressure, and to other procedures to precondition the package prior to testing the package to determine the degree of hermeticity of the package, with said test chamber assembly comprising:

a. a test chamber of fluid-impervious material, with said test chamber having means for opening and for closing said test chamber, and with said test chamber having a first, a second, a third, a fourth, and a fifth suitably positioned opening;
   b. a source of gas under high pressure, with said source having an outlet;
   c. a first hollow conduit having two ends, with one end connected to the outlet of said source of gas under high pressure, and with the other end connected to the first opening of said test chamber, to permit the flow therein of the gas from said gas source into said test chamber;
   d. a pressure regulator, disposed between said gas source outlet and said first opening of test chamber, with said pressure regulator connected to said first hollow conduit to regulate the pressure of the gas from said gas source to said test chamber;
   e. a first pressure shutoff valve, disposed between said pressure regulator and said first opening of said test chamber, with said first pressure shutoff valve connected to said first hollow conduit to control the flow of gas from said gas source to said test chamber;
   f. a first vacuum shutoff valve, disposed between said first pressure shutoff valve and said first opening of said test chamber, with said first vacuum shutoff valve connected to said first hollow conduit;
   g. a vacuum pump having an opening;
   h. a second hollow conduit having two ends, with one end connected to the opening of said vacuum pump, and with the other end connected to the second opening of said test chamber;
   i. a second vacuum shutoff valve, disposed between said vacuum pump opening and said second opening of said test chamber, with said second vacuum shutoff valve connected to said second hollow conduit;
   j. a safety valve;
   k. a third hollow conduit having two ends, with one end connected to said safety valve, and with the other end connected to the third opening of said test chamber;
   l. a vacuum gauge having an opening;
   m. a fourth hollow conduit having two ends, with one end connected to the opening of said vacuum gauge, and with the other end connected to the fourth opening of said test chamber;
   n. a source of fluorocarbon liquid, with said source having an outlet;
   o. a fifth hollow conduit having two ends, with one end connected to the outlet of said source of fluorocarbon liquid, and with the other end connected to the fifth opening of said test chamber, to permit the flow therein of the fluorocarbon liquid from said fluorocarbon liquid source into said test chamber;
   p. a second pressure shutoff valve, disposed between said source of fluorocarbon liquid and said test chamber, with said second pressure shutoff valve connected to said fifth hollow conduit to control the flow of the fluorocarbon liquid from said source of fluorocarbon liquid to said test chamber;

q. a third vacuum shutoff valve, disposed between said second pressure shutoff valve and said fifth opening of said test chamber, with said third vacuum shutoff valve connected to said fifth conduit;

r. a sixth hollow conduit disposed within said test chamber and having two ends, with one end of said sixth hollow conduit connected both to the fifth opening of said test chamber and to that end of said fifth hollow conduit which is connected to the fifth opening of said test chamber;

s. a receptacle open at the top and of such dimensions and of such a configuration as to accept and as to house the hermetically sealed package which is to be preconditioned, and as to fit into said test chamber, and also as to fit under the other end of said sixth hollow conduit, with said receptacle made of transparent material which is impervious to the fluorocarbon liquid from said source of fluorocarbon liquid;

t. and, a screen positioned within said receptacle, and disposed above the hermetically sealed package which is to be preconditioned, when the hermetically sealed package is within said receptacle.

2. The test chamber assembly, as set forth in claim 1, wherein said test chamber with means for opening and for closing the test chamber includes a container which is open at the top and a lid for the open top of said container, with said lid permitting the covering and closing, and the uncovering and opening, of the open top of said container.

3. The test chamber assembly, as set forth in claim 1, wherein the gas in said source of gas under high pressure is nitrogen.

4. The test chamber assembly, as set forth in claim 1, wherein the fluorocarbon liquid in said source of fluorocarbon liquid is a fluorocarbon liquid of the completely fluorinated type.

5. The test chamber assembly, as set forth in claim 1, wherein said screen which is positioned within said receptacle is made of stainless steel.

* * * * *